United States Patent [19]
Anderton et al.

[11] Patent Number: 6,089,683
[45] Date of Patent: Jul. 18, 2000

[54] TRACK BUSHING HAVING LASER CLADDING END TREATMENT FOR IMPROVED ABRASION AND CORROSION RESISTANCE, AND A PROCESS

[75] Inventors: Peter W. Anderton, Peoria, Ill.; Charles E. Clark, Red Lion, Pa.; William A. Holt, Dunlap, Ill.; William J. Trimble, Peoria, Ill.; Jian Zhang, Dunlap, Ill.

[73] Assignee: Caterpillar Inc., Peoria, Ill.

[21] Appl. No.: 09/228,916

[22] Filed: Jan. 11, 1999

Related U.S. Application Data

[62] Division of application No. 08/835,886, Apr. 8, 1997.

[51] Int. Cl.⁷ .................................................. B62D 55/00
[52] U.S. Cl. ........................ 305/103; 305/101; 305/102; 305/105
[58] Field of Search .................................... 305/100, 101, 305/102, 103, 104, 105, 106; 384/912, 913, 625

[56] References Cited

U.S. PATENT DOCUMENTS

| | | |
|---|---|---|
| 4,042,282 | 8/1977 | Haslett et al. |
| 4,117,302 | 9/1978 | Earle et al. .............................. 219/121 |
| 4,125,926 | 11/1978 | Gale et al. ............................... 29/156.5 |
| 4,218,494 | 8/1980 | Belmondo et al. ........................ 427/35 |
| 4,295,654 | 10/1981 | Kawamura et al. ..................... 305/101 |
| 4,474,861 | 10/1984 | Ecer ......................................... 428/614 |
| 4,688,805 | 8/1987 | Crotti et al. ............................. 277/381 |
| 4,819,999 | 4/1989 | Livesay et al. .......................... 305/103 |
| 4,848,934 | 7/1989 | Blakely et al. .......................... 384/625 |
| 5,249,868 | 10/1993 | Watts ....................................... 284/276 |
| 5,257,858 | 11/1993 | Taft .......................................... 305/104 |
| 5,405,660 | 4/1995 | Psiuk et al. .............................. 427/597 |
| 5,449,536 | 9/1995 | Funkhouser et al. ................... 427/597 |
| 5,580,472 | 12/1996 | Maybon ............................. 219/121.66 |
| 5,593,234 | 1/1997 | Liston ...................................... 384/492 |

*Primary Examiner*—S. Joseph Morano
*Assistant Examiner*—Long Bao Nguyen
*Attorney, Agent, or Firm*—Kathleen M. Ryan; Brian G. Addison

[57] ABSTRACT

A track bushing for an endless track of a track-type vehicle includes a cylindrical tubular shape, a first end and a second end, and first end and second bearing surfaces adjacent respective ends. A circumferential groove having a depth in an axial direction is formed in at least one of the first end and second end bearing surfaces. An abrasion resistant material is deposited within the circumferential groove and bonded to the bushing at a bond interface. The abrasion resistant material at the bond interface is diluted with no greater than 5% by weight track bushing material.

8 Claims, 4 Drawing Sheets

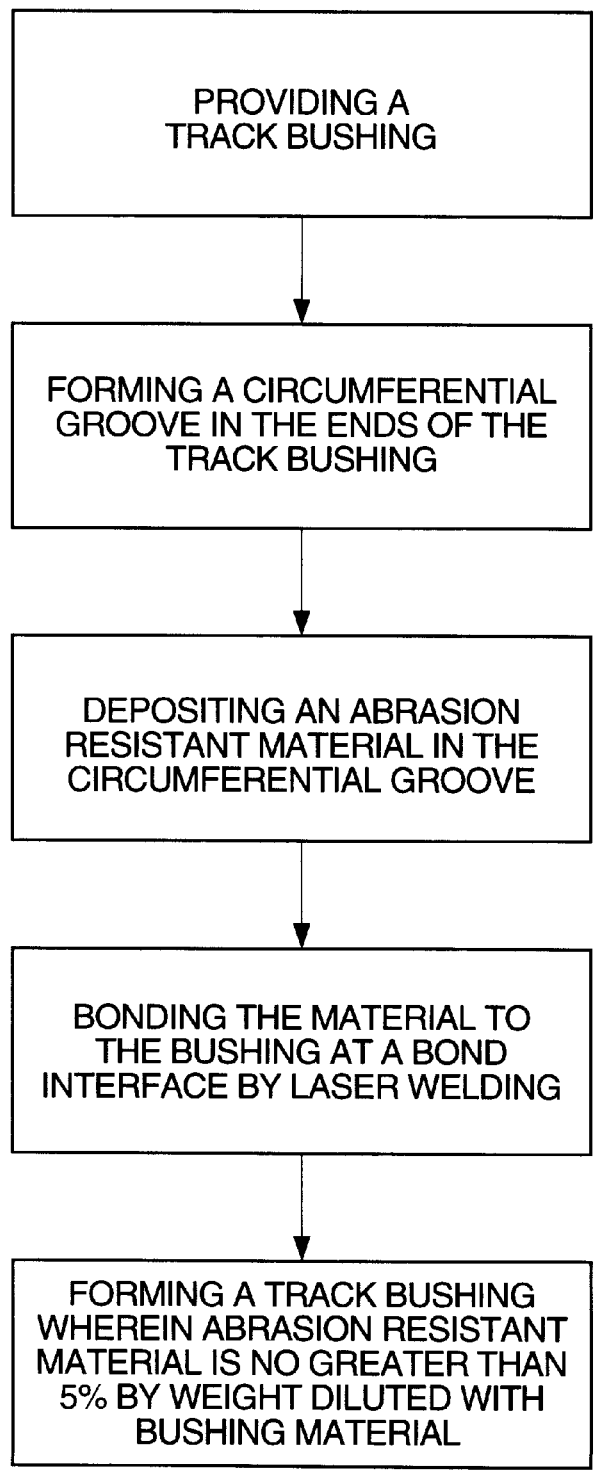
Fig_1_

TRACK BUSHING HAVING LASER CLADDING END TREATMENT FOR IMPROVED ABRASION AND CORROSION RESISTANCE, AND A PROCESS

This is a divisional application of Application Ser. No. 08/835,886, filed Apr. 8, 1997.

TECHNICAL FIELD

The present invention relates generally to track bushings for the endless tracks of a track-type vehicle, and more particularly to a track bushing having laser cladding end treatment for improved abrasion and corrosion resistance and a process for making the same.

BACKGROUND ART

The track bushings used in the track pins for linking the track links for the endless track of a track type vehicle, such as an earthmoving vehicle for example, are subjected to a very severe operating environment. The ends of the track bushing and the inner surface of the track bushing adjacent its two ends are the main bearing surfaces that respectively slide against the track seal and the track pin. The dirt and debris tend to wear the ends of the track bushings sliding against the sealing surface of a track seal. This happens because the dirt and debris particles get lodged between the seal and the bushing end surface and eventually wear a groove into the track bushing end. The formation of a wear groove causes oil to leak out of the pin joint assembly leading to an eventual failure of the joint.

It is desirable to provide a track bushing that has a very hard, highly corrosion resistant coating on its ends that protects the track bushing ends from corrosion and erosion. It is also very desirable to provide a track bushing having very high resistance to groove formation on its ends when the ends are biased against a track seal. It is further desirable to deposit a hard coating within a pre-formed groove in the track bushing end to provide substantial improvement in the longevity of wear resistance. It is yet further desirable to provide a process for depositing a hard coating within a pre-formed groove so that not only is there a very strong bond between the substrate and the coating but that there is a least amount of dilution of the substrate metal and the coating metal. It is also desirable to provide a process whereby a hard coating can be deposited in a manner desired above without any appreciable tempering of the bushing metal.

The present invention is directed to overcome one or more problems of heretofore utilized track bushings for track-type vehicles.

DISCLOSURE OF THE INVENTION

In one aspect of the present invention, a track bushing made from steel, for an endless track of a track-type vehicle, is disclosed. The track bushing comprises a cylindrical tubular shape, a first end and a second end. The track bushing further comprises a first end bearing surface adjacent the first end and a second end bearing surface adjacent the second end. A circumferential groove is formed in at least one of the first end bearing surface and the second end bearing surface. The circumferential groove has a depth in an axial direction. An abrasion resistant material is deposited within the circumferential groove and metallurgically bonded to the bushing at a bond interface. The abrasion resistant material at the bond interface is diluted with no greater than 5% by weight track bushing steel material.

In another aspect of the present invention, a process for making a corrosion resistant track bushing for an endless track of a track-type vehicle is disclosed. The process comprises the following steps. A track bushing having a cylindrical tubular shape, a first end and a second end, a first end bearing surface adjacent the first end and a second end bearing surface adjacent the second end, is provided. A circumferential groove is formed in at least one of the first end bearing surface and the second end bearing surface, the circumferential groove having a depth in an axial direction. An abrasion resistant material is deposited within the circumferential groove. The abrasion resistant material is bonded to the bushing at a bond interface by laser welding techniques. A track bushing is formed wherein the abrasion resistant material at the bond interface is diluted with no greater than 5% by weight track bushing steel material.

BRIEF DESCRIPTION OF THE DRAWINGS

FIG. 1 is a schematic flow diagram of the process of the present invention;

FIG. 3 is a sectional side view of an enlarged portion of a bearing end of the track bushing of FIG. 1a.

BEST MODE FOR CARRYING OUT THE INVENTION

Figure 1A:
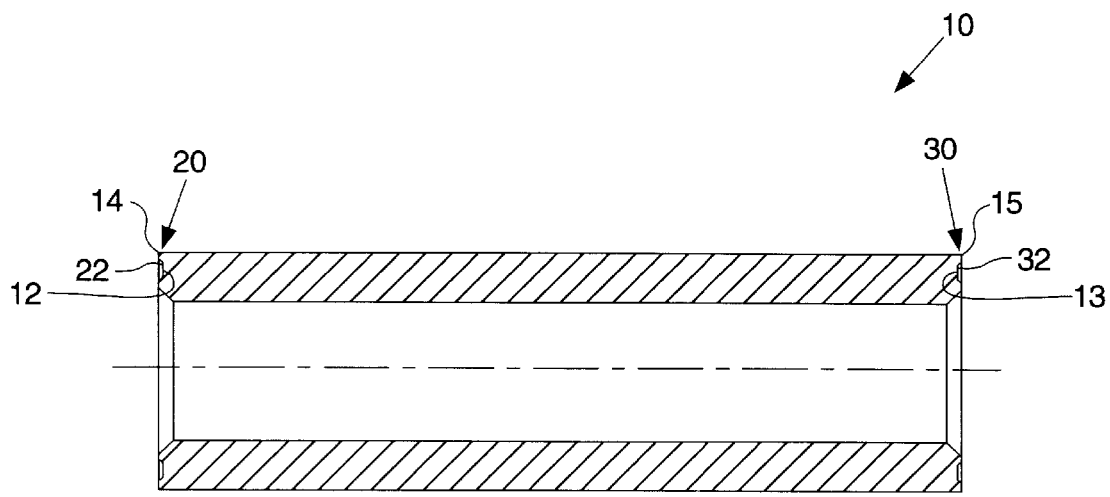
FIG. 1a is sectional side view of a track bushing of the present invention.

Referring to FIG. 1 which shows a schematic of a process for making a corrosion resistant track bushing for an endless track of a track-type vehicle, and FIG. 1a which shows a track bushing, the process includes the steps of providing a track bushing 10 having a cylindrical tubular shape, a first end 20 and a second end 30, a first end bearing surface 22 and a second end bearing surface 32 adjacent the respective first and second ends 20,30. The process also includes the step of forming a circumferential groove in at least one of the first end bearing surface 22 and the second end bearing surface 32. Preferably, the circumferential groove is formed in both the first end and second end bearing surfaces as shown in FIG. 1a and indicated by numerals 12,13. Desirably, the circumferential grooves 12,13 respectively have a depth in an axial direction. The process further includes the step of depositing an abrasion-resistant material within the circumferential grooves 12,13. Desirably, the abrasion-resistant material is either steel, nickel, cobalt or chromium based alloys and preferably, the abrasion-resistant material is a martensitic stainless steel.

In the preferred embodiment of the present invention, the process further includes the step of bonding the abrasion-resistant material to the bushing at a bond interface by laser welding techniques. Desirably, at the bond interface, the abrasion-resistant material is diluted with the track bushing material in an amount no greater than 10% by weight of the track bushing material and preferably the abrasion-resistant material is diluted with the track bushing material in an amount no greater than 5% by weight abrasion-resistant material in track bushing material.

The term "bond interface" as used herein means the interface between the track bushing substrate and the abrasion-resistant material. This bond interface is formed when the abrasion-resistant material is deposited in the circumferential groove and is fused with the track bushing substrate. The term "diluted" as used herein means that there is a compositional change between the track bushing substrate and the abrasion-resistant material. The compositional change occurs at the bond interface. Thus, the bond interface composition includes a mixture of the track bushing material and the abrasion-resistant material. This mixed composition of the bond interface is referred to as dilution and it is an aspect of this invention to keep this dilution as small as possible so that the predominant composition of the abrasion-resistant material deposited in the circumferential groove is that of the abrasion-resistant material.

The term "laser welding techniques" as used herein means any high energy sources such as a $CO_2$ or Nd:YAG lasers for fusing the abrasion-resistant materials to the bushing ends. As one skilled in the art will appreciate, the materials to be deposited can be deposited by either pre-placing a powder in the laser beam path or injecting a powder into the laser beam and/or into the melt pool. The deposited and bonded abrasion-resistant material is called a laser-cladded bushing end treatment. In the preferred embodiment of the present invention, the process includes laser welding parameters such as the power density of a laser welder, laser optics, laser scan frequency and amplitude of the scan frequency such that there is a minimum dilution of the clad material or the abrasion-resistant material with the base material or the track bushing material.

In the preferred embodiment, the laser welding method includes the steps of providing a laser welder having a power density rating and desirably in the range of about 2 kW to about 25 kW. Desirably, the laser welder is a Nd:YAG laser having a power density rating in the range of about 2 kW to about 3 kW and preferably the laser welder is a $CO_2$ laser having a power density in the range of about 6 kW to about 20 kW. In the best mode, the laser used is a $CO_2$ laser having a 6 kW power rating. In the preferred embodiment, the laser welding method includes the step of adjusting the laser optics to provide a defocused laser beam for melting the abrasion-resistant material. The process also includes adjusting scan frequency desirably in the range of about 6 cycles to about 45 cycles per second. Preferably, the scan frequency is about 12 cycles per second. The process also includes adjusting amplitude of the scan frequency to a value at least greater than the width of the circumferential groove. Further, in the preferred embodiment, the abrasion-resistant material is in the form of a powder desirably having a particle size smaller than −30 mesh size and preferably having a particle size in the range of about −100 mesh size to about +325 mesh size. In the preferred embodiment, the laser welding method includes the step of adjusting a laser cladding speed in the range of about 5 inches per minute to about 100 inches per minute and preferably a processing speed of about 30 inches per minute when a 6 kW CO2 laser source is used.

In the preferred embodiment, the above parameters set forth for the laser welding method are desired so as to keep the dilution of the cladded abrasion resistant material with the bushing base material such that the dilution is no more than 5 percent by weight cladded material in the track bushing material.

In the preferred embodiment, the process includes the step of depositing the abrasion-resistant material in the groove by preplacing the material in the groove and then scanning a laser beam over the preplaced material. Alternatively, the abrasion-resistant material can be deposited by delivering the material into the laser beam in an off-axis manner. In the preferred embodiment, the martensitic steel abrasion-resistant material is delivered and deposited in the circumferential groove by delivering the steel powder into the laser beam in a co-axial manner. Preferably, the steel powder is preheated to facilitate a smoother flow of the powder.

The terms "off-axis" and "co-axial" delivery, as used in conjunction with the laser welding techniques described above, are well known to those skilled in the art of laser welding and need not be described in any further detail given that the critical processing parameters such as the laser power density, the scan frequency, the amplitude of the scan frequency and the cladding speed and powder particle size have already been set forth above.

In the preferred embodiment, the process includes depositing abrasion-resistant materials that can be fused with the track bushing and such materials can be selected from ferrous, nickel or cobalt based materials or even chromium nitride. However, it is preferred to use steel and is further preferred to use martensitic steel as an abrasion-resistant material. In the preferred embodiment, the martensitic steel material deposited in the groove has a Rockwell C hardness at least greater than RC 52 and preferably in the range of RC 58 to RC 60.

It has been found by the Inventors that the process of the present invention allows for the abrasion-resistant cladding to be bonded to the track bushing without exposing the track bushing to a temperature higher than 400° F. It is important not to expose or subject the track bushing to temperatures greater than 400° F. to minimize any tempering of the track bushing.

Figure 2:
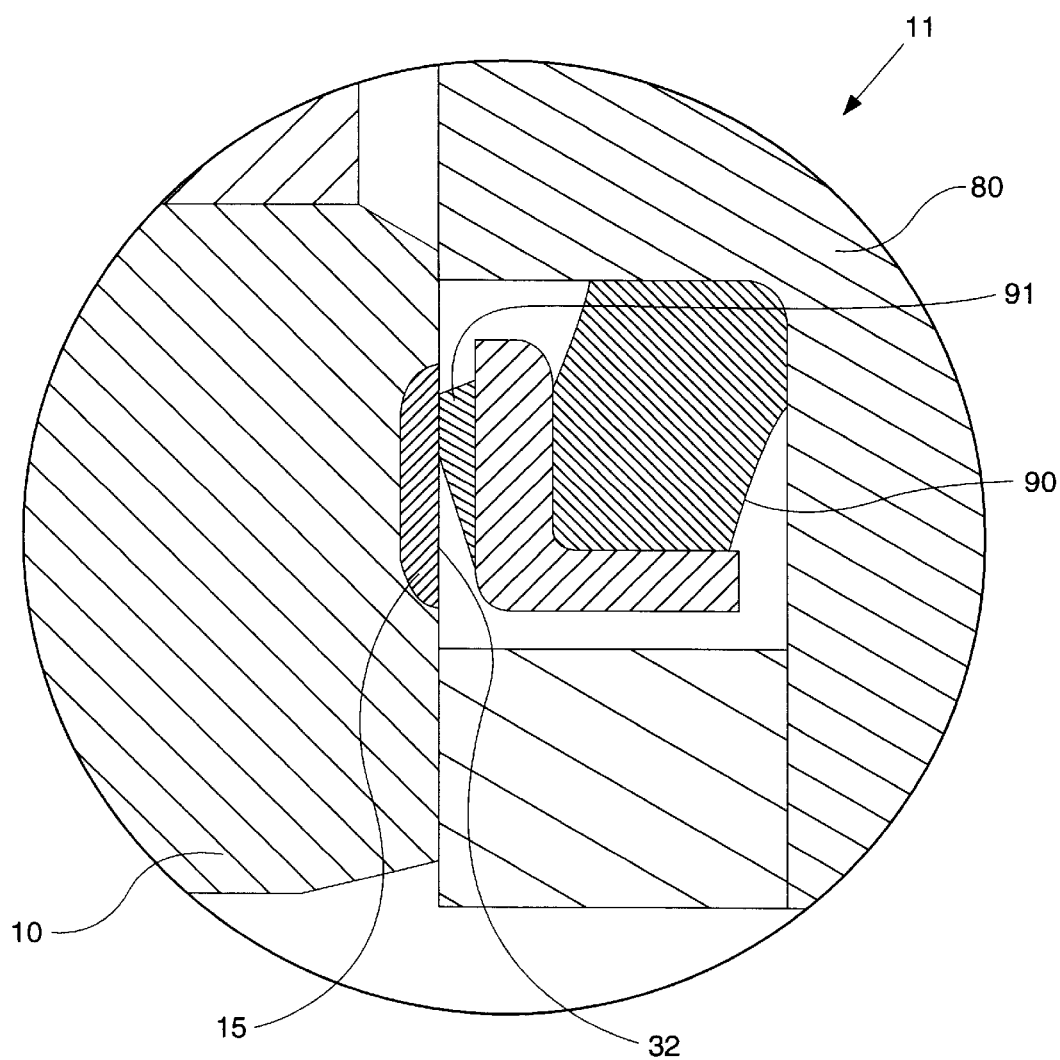
FIG. 2 is a sectional side view of the track bushing of FIG. 1a in sealing engagement with a track seal affixed within a track link.

Referring now to FIG. 2, in another embodiment of the present invention, one end of a track bushing made from steel for an endless track of a track-type vehicle is shown in sealing engagement with a track seal. FIG. 2 shows such an arrangement 11 which includes a track bushing 10 having an abrasion-resistant material 15 deposited in a circumferential groove 13 at one of the bearing ends 32. The track bushing 10 has a first end 20, a second end 30 and a first end bearing surface 22 and a second end bearing surface 32 adjacent respective first and second ends. Preferably, the track bushing has abrasion-resistant material 14,15 deposited in circumferential grooves 12,13 respectively adjacent respective ends 22,32. The track bushing includes the abrasion-resistant material being metallurgically bonded to the bushing at a bond interface and the abrasion-resistant material is diluted with the track bushing steel material in an amount no greater than 5 percent by weight abrasion-resistant material in track bushing steel material. Preferably, the abrasion-resistant material is diluted with no greater than 3 percent by weight track bushing steel and even more preferably no greater than 1 percent by weight of track bushing steel. In the preferred embodiment, the abrasion-resistant material is desirably stainless steel and preferably martensitic stainless steel having a composition by weight percent comprising:

| | |
|---|---|
| carbon | 0.06 maximum |
| chromium | 11.0 to 12.5 |
| nickel | 4.0 to 5.5 |
| molybdenum | 0.4 to 0.7 |
| manganese | 1.00 maximum |
| silicon | 0.90 maximum |
| phosphorous | 0.04 maximum |
| sulfur | 0.03 maximum |
| copper | 0.75 maximum |
| iron | balance. |

In the preferred embodiment, the abrasion-resistant material is metallurgically welded to the track bushing by laser welding means.

Referring again to FIG. 2 which shows the track bushing in sealing engagement with a track seal, FIG. 2 shows a track bushing 10 wherein the abrasion-resistant material 15 deposited in groove 13 is in sealing engagement with a seal 90 having a sealing lip 91. The seal 90 is fixed in a track link 80. As can be seen from FIG. 2, it is desirable that the sealing engagement between the track bushing and the track seal occurs at the corrosion and abrasion-resistant cladding of the track bushing end.

Figure 3:
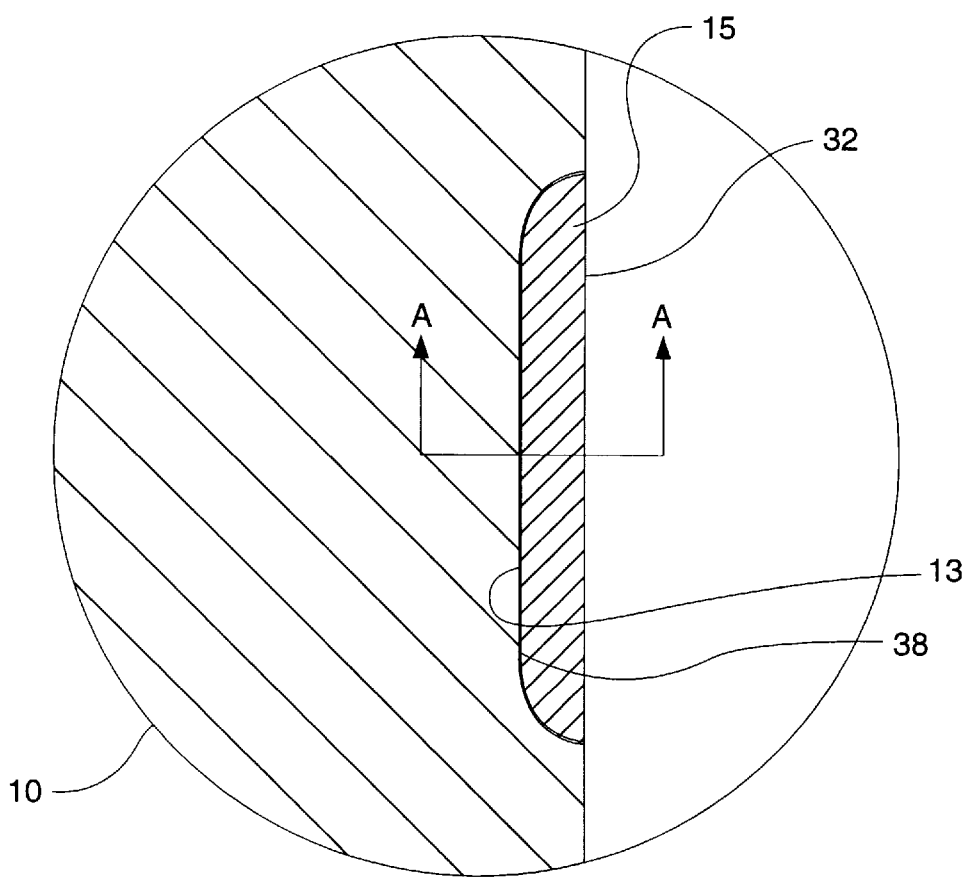

Referring now to FIG. 3 which shows a magnified sectional side view of the second bearing end having the laser cladded abrasion-resistant steel material, the bonding between the cladding and the track bushing is defined at the bonding interface 38.

Figure 4:
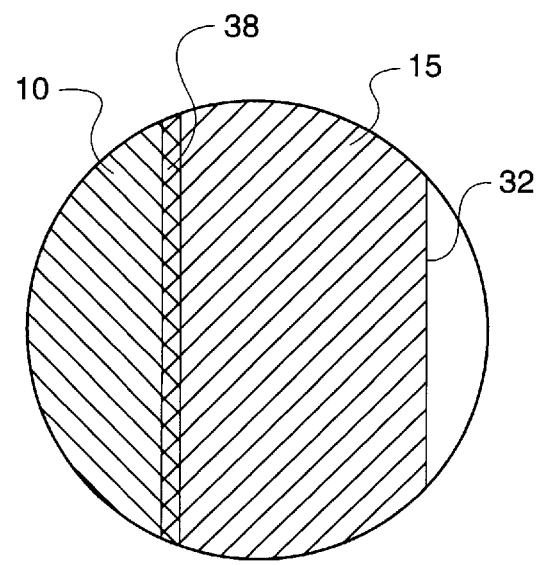
FIG. 4 is a magnified view of the detail A—A shown in FIG. 3, showing the detail of the bonding interface, according to one embodiment of the present invention.

Referring to FIG. 4 which shows a magnified section of FIG. 3, the bonding interface 38 desirably has a composition which is a mixture of the track bushing material and the abrasion-resistant material. Desirably, the bonding interface has a thickness no greater than 5 percent of the circumferential groove depth and preferably no greater than 3 percent of the thickness of the circumferential groove depth. In this manner, the abrasion-resistant cladding 15 has a composition distinct from the bond interface 38 composition.

In the preferred embodiment, the laser cladding is free of defects such as cracks, entrapped slag or porosity and has a polished surface having a Rockwell C hardness of about RC 60 and the process of the present invention is useful for manufacturing new track bushings or for refurbishing used track bushings.

Industrial Applicability

The present invention is particularly useful for improving the abrasion and corrosion resistance of track bushings used with the track pins for linking the track links for the endless track of a track type vehicle, such as an earthmoving vehicle for example. The present invention is expected to increase the useful service life of these track bushings by as much as 500% or more.

Other aspects, objects and advantages of this invention can be obtained from a study of the drawings, the disclosure and the appended claims.

We claim:

1. A track bushing made from steel, for an endless track of a track-type vehicle, comprising:

a cylindrical tubular shape, a first end and a second end;

a first end bearing surface adjacent said first end and a second end bearing surface adjacent said second end;

a circumferential groove formed in at least one of said first end bearing surface and said second end bearing surface, said circumferential groove having a depth in an axial direction; and an abrasion resistant material deposited within said circumferential groove and metallurgically bonded to said bushing at a bond interface, said abrasion resistant material at said bond interface being diluted with no greater than 5% by weight track bushing steel material.

2. The track bushing, as set forth in claim 1, wherein said abrasion resistant material at said bond interface is diluted with no greater than 3% by weight track bushing steel.

3. The track bushing, as set forth in claim 2, wherein said abrasion resistant material at said bond interface is diluted with no greater than 1% by weight track bushing steel.

4. The track bushing, as set forth in claim 1, wherein said abrasion resistant material is stainless steel.

5. The track bushing, as set forth in claim 4, wherein said abrasion resistant material is martensitic stainless steel.

6. The track bushing, as set forth in claim 5, wherein said abrasion resistant material is martensitic stainless steel having a composition by weight percent, comprising:

| | |
|---|---|
| carbon | 0.06 maximum |
| chromium | 11.0 to 12.5 |
| nickel | 4.0 to 5.5 |
| molybdenum | 0.4 to 0.7 |
| manganese | 1.00 maximum |
| silicon | 0.90 maximum |
| phosphorous | 0.04 maximum |
| sulfur | 0.03 maximum |
| copper | 0.75 maximum |
| iron | balance. |

7. The track bushing, as set forth in claim 1, wherein said abrasion resistant material is metallurgically welded to each of said first end bearing surface and said second end bearing surface.

8. The track bushing, as set forth in claim 1, wherein said abrasion resistant material is metallurgically welded to said track bushing by laser welding means.

* * * * *